US011763695B2

(12) United States Patent
Van Putten

(10) Patent No.: US 11,763,695 B2
(45) Date of Patent: Sep. 19, 2023

(54) METHOD FOR COMPUTER-IMPLEMENTED SIMULATION OF RADAR RAW DATA

(71) Applicant: Siemens Industry Software NV, Leuven (BE)

(72) Inventor: Thijs Van Putten, Sassenheim (NL)

(73) Assignee: SIEMENS INDUSTRY SOFTWARE NV, Leuven (BE)

(*) Notice: Subject to any disclaimer, the term of this patent is extended or adjusted under 35 U.S.C. 154(b) by 143 days.

(21) Appl. No.: 17/600,706

(22) PCT Filed: Apr. 4, 2019

(86) PCT No.: PCT/EP2019/058501
§ 371 (c)(1),
(2) Date: Oct. 1, 2021

(87) PCT Pub. No.: WO2020/200454
PCT Pub. Date: Oct. 8, 2020

(65) Prior Publication Data
US 2022/0148451 A1 May 12, 2022

(51) Int. Cl.
*G09B 9/54* (2006.01)
*G01S 7/40* (2006.01)
(Continued)

(52) U.S. Cl.
CPC .............. *G09B 9/54* (2013.01); *G01S 7/4052* (2013.01); *G01S 13/582* (2013.01); *G01S 13/931* (2013.01)

(58) Field of Classification Search
CPC ....... G09B 9/54; G01S 7/4052; G01S 13/582; G01S 13/931; G01S 13/42; G01S 13/584
(Continued)

(56) References Cited

U.S. PATENT DOCUMENTS 7,602,332 B1 * 10/2009 Lee ........................ G09B 9/54
345/426
2013/0009804 A1  1/2013 Valentine
(Continued)

FOREIGN PATENT DOCUMENTS

GB       2451615 A  *  2/2009  ........... G01S 7/4052
JP   2014529965 A      11/2014
(Continued)

OTHER PUBLICATIONS

Cacciamano, A., et al. "A coordinate registration technique for OTH sky-wave radars based on 3D ray-tracing and sea-land transitions." Progress In Electromagnetics Research 147 (2012). pp. 146-150.
(Continued)

*Primary Examiner* — Bernarr E Gregory
*Assistant Examiner* — Alexander L. Syrkin
(74) *Attorney, Agent, or Firm* — Lempia Summerfield Katz LLC

(57) ABSTRACT

A method and system for computer-implemented simulation of radar raw data, where the radar raw data are generated for a synthetic MIMO radar system including a transmitter array of several transmitters for transmitting radar signals and a receiver array of several receivers for receiving radar echoes of the radar signals. In this method, ray tracing of a radar signal sent from a preset transmitting position within the transmitter array and received at a preset receiving position within the receiver array is performed based on a 3D model of a virtual area adjacent to the MIMO radar system, where the ray tracing determines propagations of a plurality of rays within the radar signal from the preset transmitting position to the preset receiving position. The propagation of each ray is dependent on a first angle and a second angle describing the direction of a respective ray at the preset transmitting position. By using first-order derivatives with respect to the
(Continued)

first angle and the second angle, propagations of a plurality of modified rays originating from a respective transmitter and received at a respective receiver are determined based on a linear approximation. The modified rays are processed in order to determine the radar raw data.

12 Claims, 2 Drawing Sheets

(51) Int. Cl.
    *G01S 13/58*     (2006.01)
    *G01S 13/931*     (2020.01)

(58) Field of Classification Search
    USPC .......................................................... 342/25
    See application file for complete search history.

(56) References Cited

U.S. PATENT DOCUMENTS

| | | |
|---|---|---|
| 2013/0051486 A1 | 2/2013 | Pi et al. |
| 2015/0236428 A1 | 8/2015 | Caratelli et al. |
| 2017/0010347 A1* | 1/2017 | Schütte ................. G01S 7/4052 |
| 2017/0139038 A1* | 5/2017 | Reil ...................... G01S 7/4052 |
| 2018/0017666 A1* | 1/2018 | Kato ..................... G01S 7/4052 |

FOREIGN PATENT DOCUMENTS

| | | | |
|---|---|---|---|
| JP | 2015534367 A | 11/2015 | |
| WO | WO-2007113790 A1 * | 10/2007 | ........... G01S 7/4052 |
| WO | 2017222385 A1 | 12/2017 | |

OTHER PUBLICATIONS

Hirsenkorn, Nils, Paul Subkowski, Timo Hanke, Alexander Schaermann, Andreas Rauch, Ralph Rasshofer, and Erwin Biebl. "A ray launching approach for modeling an FMCW radar system." In 2017 18th International Radar Symposium (IRS), pp. 1-10. IEEE, 2017.
Igehy, Homan. "Tracing ray differentials." In Proceedings of the 26th annual conference on Computer graphics and interactive techniques, pp. 179-186. 1999.
International Search Report and the Written Opinion for International Patent Application PCT/EP2019/058501 dated Dec. 4, 2019.
Long, He, Guo Lixin, and Li Jiangting. "The simulation of short wave propagation by ray-tracing method in sporadic E layer of ionosphere." In Proceedings of 2014 3rd Asia-Pacific Conference on Antennas and Propagation, pp. 724-727. IEEE, 2014.
Reichardt, Lars, Jurgen Maurer, Thomas Fugen, and Thomas Zwick. "Virtual drive: A complete V2X communication and radar system simulator for optimization of multiple antenna systems." Proceedings of the IEEE 99, No. 7 (2011): 1295-1310.
Weiskopf, Marco, Christoph Wohlfahrt, and Albrecht Schmidt. "Integration Solution to Safeguard a Real Radar Sensor in the System Network with the hardware-in-the-Loop Test Technology" Automotive—Safety & Security 2014 (2015). pp. 1-13 with abstract.

* cited by examiner

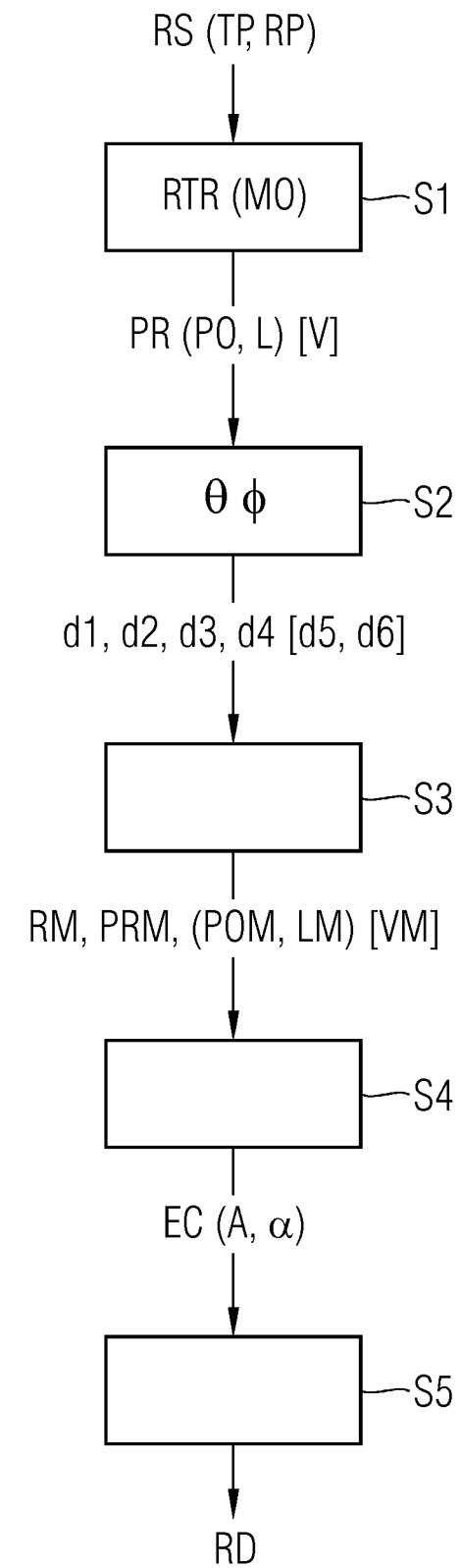

METHOD FOR COMPUTER-IMPLEMENTED SIMULATION OF RADAR RAW DATA

CROSS REFERENCE TO RELATED APPLICATIONS

This present patent document is a § 371 nationalization of PCT Application Serial Number PCT/EP2019/058501, filed Apr. 4, 2019, designating the United States, which is hereby incorporated in its entirety by reference.

FIELD

Embodiments relate to a method and an apparatus for computer-implemented simulation of radar raw data.

BACKGROUND

In order to simulate radar raw data for a synthetic radar system, ray tracing methods are used. Ray tracing methods track a plurality of rays within the radar signal along paths from the transmitter to the receiver. By combining the rays, a radar echo received by the receiver may be determined. In such ray tracing methods, a 3D model of a virtual area adjacent to the synthetic radar system is used in order to calculate the deflections of the rays due to interactions with objects in the area. Documents WO 2017/222385 A1, N. Hirsenkorn et al., "A ray launching approach for modeling an FMCW radar system", 2017 18th International Radar Symposium (IRS), Prague, 2017, pp. 1-10., and M. Weiskopf, C. Wohlfahrt, and A. Schmidt, "Integrationslösung zur Absicherung eines realen Radarsensors im Systemverbund mit der Hardware-in-the-Loop Testtechnologie", Automotive—Safety & Security, 2014 describe radar simulations based on ray tracing.

Many known radar systems are MIMO systems (MIMO=Multiple Input Multiple Output) including of multiple transmitters and receivers, generating one output channel for each receiver. When applying conventional ray tracing approaches for such systems, this will result in a high number of rays to be traced because rays for several transmitters and receivers have to be processed. Radar systems currently under development may easily have more than 100 transmitter-receiver pairs (the number of transmitters multiplied by the number of receivers), causing severe performance and memory limitations when using conventional ray tracing methods.

BRIEF SUMMARY AND DESCRIPTION

The scope of the present invention is defined solely by the appended claims and is not affected to any degree by the statements within this summary. The present embodiments may obviate one or more of the drawbacks or limitations in the related art.

Embodiments simulate radar raw data for a synthetic MIMO radar system including a high performance and low memory consumption.

The method provides a computer-implemented simulation of radar raw data, where the radar raw data are generated for a synthetic (virtual) MIMO radar system including a transmitter array of several (virtual) transmitters for transmitting radar signals and a receiver array of several (virtual) receivers for receiving radar echoes of the radar signals. The method uses a single preset transmitting position within the transmitter array and a single preset receiving position within the receiver array. The positions do not necessarily correspond to actual positions of transmitters and receivers within the transmitter and receiver arrays. However, the positions are regarded as simulated transmitter and receiver positions such that a radar signal is sent from the preset transmitting position and its echo is received at the preset receiving position. For the preset transmitting position and the preset receiving position, the following steps a) to e) are performed for a (virtual) transmission event of at least one transmitter of the transmitting array. At such a transmission event, more than one transmitter and particularly all transmitters of the transmitting array may transmit radar signals simultaneously.

In step a), ray tracing of a radar signal is performed, where the radar signal is sent from the preset transmitting position and received at the preset receiving position. This ray tracing is based on a 3D model of a virtual area adjacent to the synthetic MIMO radar system. The 3D model describes one or more objects in the virtual area and their interaction properties with the radar signal. The ray tracing determines propagations of a plurality of rays within the radar signal from the transmitting position to the receiving position. The propagation of each ray describes ray poses along the ray path from the preset transmitting position to the preset receiving position. Additionally, the propagation of each ray includes the path length of the ray path. Both the ray poses and the path length are dependent on a first angle and a second angle describing the direction of a respective ray at the preset transmitting position. Step a) is known from the prior art and may be implemented by conventional ray tracing methods. The first angle and second angle refer to spherical angles for describing directions originating from the preset transmitting position. The first and second angles may be given by a polar/elevation angle and by an azimuthal angle.

In step b) of the method, first-order derivatives are determined for each ray. The derivatives include a first derivative that is the derivative of the ray poses with respect to the first angle, a second derivative that is the derivative of the ray poses with respect to the second angle, a third derivative that is the derivative of the ray length with respect to the first angle and a fourth derivative that is the derivative of the ray length with respect to the second angle. The derivatives may be determined based on a modification of the ray differentials methods described in Homan Igehy: "Tracing Ray Differentials", SIGGRAPH '99, Proceedings of the 26th annual conference on Computer graphics and interactive techniques, pages 179-186, hereinafter "Homan".

In step c) of the method, propagations of a plurality of modified rays are determined for each ray based on a linear approximation using the derivatives as well as the deviation of the first and second angles of the modified rays from each ray. Each modified ray belongs to a different pair of a transmitter of the transmitter array and a receiver of the receiver array. Only pairs are processed that include a transmitter transmitting at the transmission event. Analogously to the non-modified rays, the propagation of a respective modified ray describes ray poses along the ray path from the transmitter to the receiver of the pair to which the respective modified ray belongs and includes the ray length of the ray path from the transmitter to the receiver. Hence, modified rays corresponding to different transmitters and receivers may be determined from a single ray without the need to perform ray tracing for each modified ray.

In step c), the linear approximation of the propagation of each modified ray is achieved by multiplying the derivatives with the corresponding angle deviations and adding this term to the ray poses or path length of the non-modified ray.

In step d) of the method, for each modified ray, the radar echo of the respective modified ray arriving at the receiver of the pair to which the respective modified ray belongs is determined based on the 3D model and based on the path length of the respective modified ray. The implementation of this step may be achieved by known methods.

In step e) of the method, for each receiver of the receiver array, the amplitude, and the phase of all radar echoes of modified rays arriving at the respective receiver are combined, thus resulting in the radar raw data.

Embodiments are based on the concept that a known ray differentials method may be adapted such that rays from multiple transmitters and receivers in a MIMO radar system may be simulated without the need to trace rays from each transmitter to each receiver. Instead, rays for different pairs of transmitters and receivers are derived by determining ray differentials for rays originating from a preset transmitting position and arriving at a preset receiving position. The method has much lower requirements with respect to computational resources than conventional ray tracing methods.

In an embodiment, additionally to the ray poses and the path length, the Doppler velocity is also considered in the method. The Doppler velocity gives information about the velocities of objects in the neighborhood of the synthetic MIMO radar system. The propagation of each ray further includes the Doppler velocity that is the sum of the relative velocities of all objects passed by a respective ray along the ray path. The relative velocities are the velocities of the passed objects relative to the MIMO radar system in the direction parallel to the respective ray. The relative velocities are dependent on the above defined first angle and second angle. In order to implement the Doppler velocity, a fifth derivative and a sixth derivative are determined additionally in step b), the fifth derivative is the first-order derivative of the Doppler velocity with respect to the first angle and the sixth derivative is the first-order derivative of the Doppler velocity with respect to the second angle. Furthermore, additionally in step c), the Doppler velocities of the modified rays are determined based on a linear approximation using the fifth and sixth derivatives and the deviation of the first and second angles of the modified rays from each ray.

In an embodiment, the preset transmitting position is such that all transmitters of the transmitter array have substantially the same distance to the preset transmitting position. Additionally, or alternatively, the preset receiving position is also defined such that all receivers of the receiver array have substantially the same distance to the preset receiving position. This embodiment provides an accurate approximation of the modified rays for all transmitters and receivers.

In an embodiment, all transmitters of the transmitter array are arranged in a flat plane. The preset transmitting position is located in the flat plane. Additionally, or alternatively, all receivers of the receiver array are arranged in a flat plane and the preset receiving position is located in the flat plane. The flat plane with respect to the transmitter array and the flat plane with respect to the receiver array do not necessarily refer to the same flat plane.

Depending on the circumstances, the number of transmitters and the number of receivers for the respective arrays may be chosen differently. The transmitting array includes at least three transmitters, e.g., three transmitters or eight transmitter or even a higher number, and the receiver array also includes at least three receivers, e.g., four receivers or eight receiver or even a higher number of receivers.

The simulation method may be used in different application domains. In an embodiment, the synthetic MIMO radar system is a radar system installed in a motor vehicle and the virtual area refers to a traffic situation in the neighborhood of the motor vehicle. In this embodiment, the simulated radar raw data may be used in order to evaluate the behavior of autonomous motor vehicles.

Besides the above method, embodiments include an apparatus for computer-implemented simulation of radar raw data, where the radar raw data are generated for a synthetic MIMO radar system including a transmitter array of several transmitters for transmitting radar signals and a receiver array of several receivers for receiving radar echoes of the radar signals. The apparatus is configured to carry out the method or according to one or more embodiments.

Embodiments provide a computer program product with a program code, that is stored on a non-transitory machine-readable carrier, for carrying out the method or according to one or more embodiments when the program code is executed on a computer.

Embodiments provide a computer program with the program code for carrying out the method or according to one or more embodiments, when the program code is executed on a computer.

BRIEF DESCRIPTION OF THE FIGURES

FIG. 2 depicts a flow diagram illustrating the steps performed in an embodiment.

DETAILED DESCRIPTION

Figure 1:
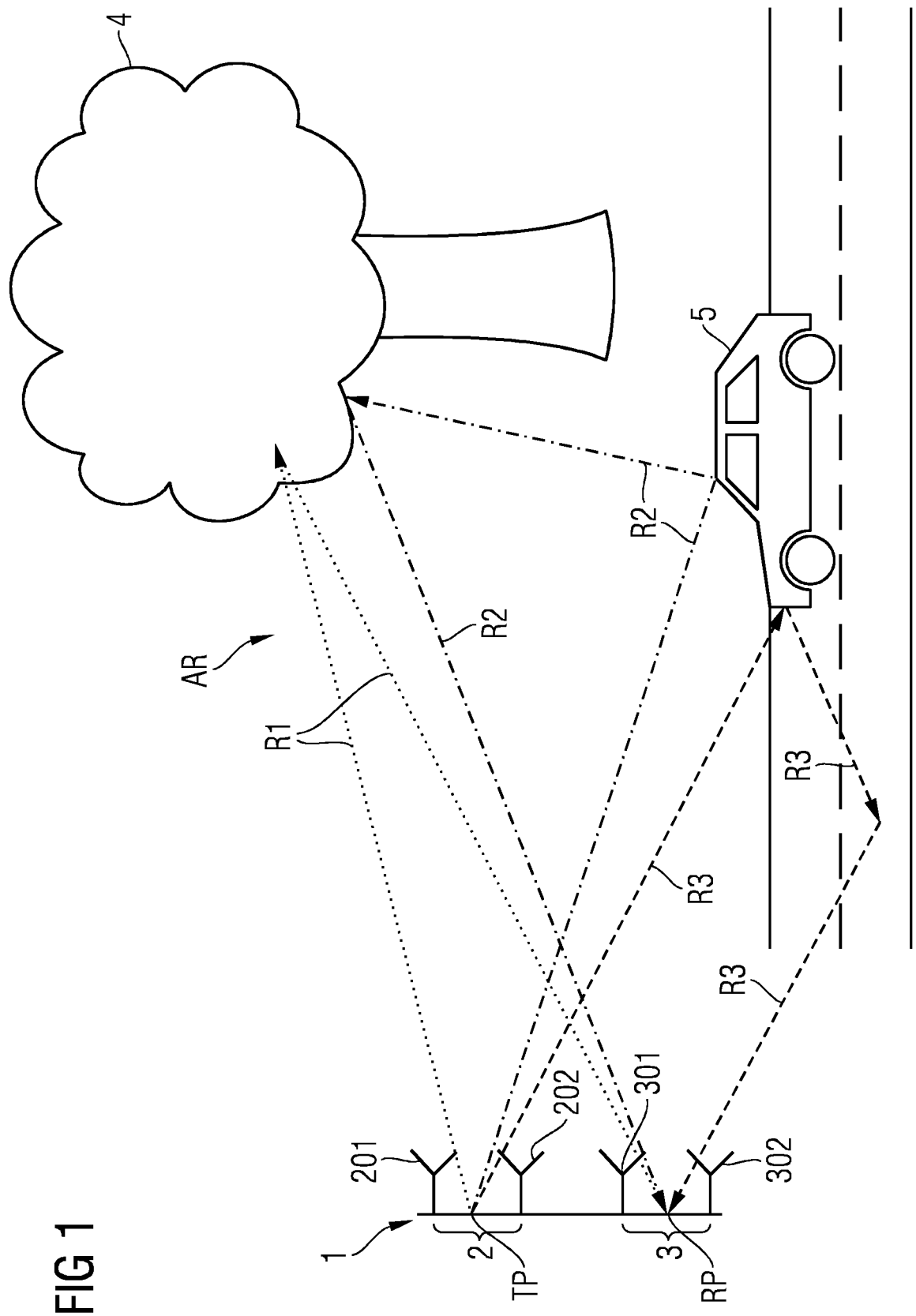
FIG. 1 depicts a schematic view illustrating the ray tracing method according to an embodiment.

Embodiments described refer to the simulation of a synthetic MIMO radar system in an automotive application. However, embodiments may also be used in other application domains. Embodiments generate synthetic radar raw data based on a virtual design of a MIMO radar system and based on a 3D model describing the (virtual) surrounding area of the MIMO radar system.

In FIG. 1, the MIMO radar system is designated by reference numeral 1. The system is e.g., integrated in a motor vehicle that is located in front of the motor vehicle designated by reference numeral 5 in FIG. 1. The MIMO radar system includes a transmitter array 2 including transmitters 201 and 202. Furthermore, the MIMO radar system includes a receiver array 3 including receivers 301 and 302. For the sake of clarity, only two transmitters and two receivers are shown for both arrays. However, the number of transmitters and receivers of the synthetic radar system may be higher.

In order to implement a radar simulation with low computation time and memory requirement, the method described in the following uses an adaption of the method based on so called ray differentials as described in Homan. At the beginning of the method described herein, rays for the MIMO radar system 1 are determined based on the assumption that the transmitter array 2 includes only one transmitting position TP and that the receiver array 3 has only one receiving position RP. The transmitting position TP is located centrally between the transmitters 201 and 202. Analogously, the receiving position RP is located centrally between the receivers 301 and 302.

Based on a conventional ray tracing method taking into account a 3D model of the area AR around the radar system 1, the paths of rays belonging to synthetic radar signals starting from the transmitting position TP and received at the receiving position RP are determined. For illustration purposes, three rays R1, R2 and R3 are shown in FIG. 1. The number of rays may be much higher. Ray R1 represented by dotted arrows is reflected by a tree 4 in the area AR before arriving at the receiving position RP. Ray R2 represented by dash-doted arrows is reflected twice at the motor vehicle 5 and the tree 4 and reaches thereafter the receiving position RP. Ray R3 represented by dashed arrows reflected in the front of the vehicle 5 and at the surface of the street where the vehicle is located before reaching the receiving position RP.

The above-described step of ray tracing based on synthetic radar signals is illustrated as step S1 in FIG. 2. The input of this step is synthetic radar signals RS starting at the transmitting position TP where the echoes of those radar signals are received at the receiving position RP. As described above, ray tracing RTR based on a conventional method is performed for those transmitting and receiving positions using a 3D model MO of the area AR. This model describes the structure of the objects as well as their interaction properties (reflection, refraction, and the like) with the radar signals.

As a result of the ray tracing method of step S1, propagations PR of several rays extending from the transmitting position TP to the receiving position RP are determined. The propagation of a respective ray includes poses PO of the ray along its path, where each pose is specified by a position on the ray path and a unit vector representing the ray direction at the corresponding position. Such poses are given in equation (3) of Homan. Additionally, the path length L of each ray is calculated as another parameter of the propagation PR of each ray. The calculation of this path length is straightforward having the information about the poses PO.

In an embodiment described in FIG. 2, the Doppler velocity V is additionally calculated. The Doppler velocity refers to a summation of the velocities of all objects that a corresponding ray hits along its path, but only the component of the velocity that is parallel to the direction of the respective ray.

The ray poses PO, the ray length L as well as the Doppler velocity V are dependent on the direction in which a respective ray is transmitted from the transmitting position TP. By varying this direction, corresponding rays starting at the positions of the transmitters 201 and 202 and being received at the positions of respective receivers 301 and 302 may be described. This is possible because it may be assumed that the distance between transmitters and receivers is small in comparison to the distance to reflection points in the virtual area AR around the synthetic MIMO radar system 1. By using ray differentials as described in the following, modified rays starting from actual transmitters and actual receivers may be derived from rays starting at the central transmitting position TP and being received at the central receiving position RP.

The method described in the following is based on modifications of the method as described in Homan. The modifications are as follows:

The image plane coordinates x and y of Homan.

The initial direction of a ray and its derivative is described in dependency on those angles $\phi$ and $\theta$ due to the changed coordinates.

In addition, a path length L is included in the propagation PR of a ray that includes the poses PO along the ray path.

In an optional variant, the Doppler velocity V is considered besides the poses PO and the path length L of a ray.

A method with the above modifications is performed in step S2 of FIG. 2. As a result, derivatives d1, d2, d3 and d4 are obtained. Optionally, derivatives d5 and d6 are obtained in case that the Doppler velocity V is taken into account. In the following, the method of step S2 is described in detail.

As described above, the image plane coordinates x and y of Homan are replaced by spherical coordinates, i.e., by the above angles $\phi$ and $\theta$. Radar transmitters typically transmit rays over a very large range of angles, potentially a range of 180°. As a consequence, the image plane used in Homan is not usable for radar signals as rays being 180° apart do not cross the same plane. Furthermore, the image plane used in Homan would not be very intuitive in a radar simulation as there is no image as such. Thus, instead of representing the direction of a ray by image plane coordinates x and y, the above-mentioned spherical coordinates $\phi$ and $\theta$ are used. The angle $\theta$ is the azimuthal angle that is the angle in the horizontal plane between the ray direction and the direction of the transmitter array. The angle $\phi$ is the elevation angle that is the angle in the vertical plane between the ray direction and the direction of the receiver array.

In order to use the method in Homan in step S2, the differentials $\delta x$ and $\delta y$ are simply replaced by the differentials $\delta\theta$ and $\delta\phi$, except for the second parts of equations (5) and (8) of Homan that describe the initial values of the direction and the direction derivative of a ray. The adaptations of equations (5) and (8) will be described in the following.

The normal vector of the transmission array, i.e., the direction with the highest radar intensity, is designated as n in the following. The vector up refers to the vertical direction of the MIMO radar system. In case that the MIMO radar system is not mounted horizontally, this vector up is not the same as the true up direction of the world. However, in the embodiment shown in FIG. 1, the vector up corresponds to the true up direction.

A ray direction is defined by two angles, namely the above defined azimuthal angle $\theta$ and the above defined elevation angle $\phi$. A ray is created by rotating the normal vector n around the vertical vector up by $\theta$ and then rotating this vector new around the vector (up x new) by the elevation angle $\phi$, where x denotes the vector cross-product.

This results in the direction D of the ray leaving the transmission array as follows:

$$D = \cos\theta\cos\phi n + \sin\theta\cos\phi(\text{up} \times n) - \sin\phi \, \text{up}$$

The derivation of the above formula is straightforward from the known equations for rotation around arbitrary vectors. Using the above equation, the direction D is already normalized. Hence, derivatives need not be calculated in two steps as Homan, where in a first step an unnormalized direction and its derivatives are calculated and in a second step the relation between the normalized and the unnormalized direction is used in order to get derivatives of the normalized direction. Instead, the derivatives of the normalized direction are obtained in the method described herein as follows:

$$\frac{\delta D}{\delta\theta} = -\sin\theta\cos\phi n + \cos\theta\cos\phi(\text{up} \times n)$$

$$\frac{\delta D}{\delta\phi} = -\sin\phi(\cos\theta n + \sin\theta(\text{up} \times n)) - \cos\phi \, \text{up}$$

In combination with derivatives for corresponding positions P of the poses (simply given by replacing x and y by φ and θ in Homan), the above differentials correspond to the derivatives d1 and d2 of FIG. 2.

In a radar simulation, another important quantity is the total path length of a ray in order to determine the phase and the amplitude of radar echoes being received at corresponding receivers. Hence, in the method described herein, the path length of a ray and its derivatives is considered as an additional parameter, contrary to Homan. The only ray operation that changes the path length is transfer as defined in section 3.1.1 of Homan. Evidently, the path length is not changed by the operations reflection and refraction as defined in sections 3.1.2 and 3.1.3 of Homan. The following equations describe the derivatives of the path length initially at the transmitting position and during the operation of a transfer:

$$\text{Initial value}: L = 0, \frac{\delta L}{\delta \theta} = 0$$

$$\text{Transfer}: L' = L + t, \frac{\delta L'}{\delta \theta} = \frac{\delta L}{\delta \theta} + \frac{\delta t}{\delta \theta}$$

The value $\delta t/\delta \theta$ may be obtained from equation (12) of Homan by just replacing x by θ. The equations for φ are completely identical to those for θ. As a result, the derivatives of the path length of a ray with respect to the angles θ and φ are obtained. Those derivatives are designated as d3 and d4 in FIG. 2.

In step S3 of FIG. 2, the above differentials d1 to d4 for rays starting at the transmitting position TP are used in order to calculate propagations PRM of modified rays RM starting at actual transmitters 201 and 202 and being received at actual receivers 301 and 302. Each propagation PRM is described by modified poses POM and a modified path length LM. Those modified quantities are determined by linear approximations based on the above derivatives d1 to d4 and the angle deviations of modified rays in comparison to a ray at the transmitting position TP.

As a result of step S3, propagations PRM of modified rays RM for each ray starting at the transmitting position TP and being received at the receiving position RP are determined. Based on the scenario of FIG. 1, for each of the rays R1 to R3, four modified rays for four different combinations of transmitters and receivers are obtained.

In an embodiment, the Doppler velocity V along a ray may also be considered in the radar simulation. This velocity is a summation of the velocities of all objects a ray hits along its path, but only the component of the velocity that is parallel to the direction of the ray.

When considering the Doppler velocity, the three ray propagation operations as defined in Homan (transfer, reflection, and refraction) are not meaningful. Instead, the Doppler velocity and its derivatives are changed in two cases, namely when a ray leaves an object and when a ray hits an object. On reflection, both of these cases occur, i.e., the ray hits the object, reflects, and leaves it. Additionally, the ray also leaves an object when it is launched from the transmitting position, and it hits an object when it arrives at the receiving position.

For the operations of the Doppler velocity, the following equations are used:
Initial value:

$$V = 0, \frac{\delta V}{\delta \theta} = 0$$

Leaving an object (including the case when leaving the transmitting position):

$$V' = V - D \cdot v_{obj}, \frac{\delta V'}{\delta \theta} = \frac{\delta V}{\delta \theta} - \frac{\delta D}{\delta \theta} \cdot v_{obj}$$

Here the · operator indicates the vector dot product and $v_{obj}$ is the velocity of the object the ray is leaving.

Finally, for hitting an object (including when arriving at the receiving position) the following equations are used:

$$V' = V + D \cdot v_{obj}, \frac{\delta V'}{\delta \theta} = \frac{\delta V}{\delta \theta} + \frac{\delta D}{\delta \theta} \cdot v_{obj}$$

The derivatives for the elevation angle φ are identical to the above equations by just substituting θ by φ. The derivatives of the Doppler velocity V with respect to both angles θ and φ are designated as d5 and d6 in FIG. 2. When the derivatives d5 and d6 of the Doppler velocity V are processed in step S3, a modified Doppler velocity VM for respective modified rays RM is obtained by a linear approximation using the derivatives d5 and d6.

Based on the modified propagations PRM of the modified rays RM, step S4 of FIG. 2 is performed. In this step, based on the 3D model MO of the area AR and the path length LM of each modified ray RM, the radar echo EC of each modified ray at the corresponding receiver is determined. This calculation is well known for a skilled person and will not be described in detail herein. The path length LM is used in order to determine the phase of a ray at the receiver. The 3D model MO is used in order to determine the amplitude changes when the ray interacts with objects in the area AR. As a result of step S4, corresponding radar echoes EC of the rays at the receivers are obtained. The radar echoes are described by an amplitude A and a phase a.

In a final step S5, the amplitude and the phase of all radar echoes of modified rays arriving at the same receiver of the receiver array are combined (i.e., summed), thus resulting in radar raw data RD for each output channel (i.e., for each receiver).

The method as described in the foregoing has several advantages. Contrary to a method in which rays from each transmitter to each receiver are simulated, embodiments decrease the number of paths that have to be found by ray tracing in a radar simulation by a factor equal to the number of transmitters and receivers. This reduces the computation time for the ray tracing and eliminates a significant memory bottleneck, as storing the found paths between the ray tracing step and the creation of the radar raw data is the largest contribution to memory usage in radar simulation.

Embodiments use a modified version of the ray differentials approach described in Homan in order to accurately transform one path into a nearby path with slightly different starting and ending points and corresponding to a path from a transmitter to a receiver. Due to the use of this modified ray differentials approach, a major step towards accurate and fast (potentially real time) simulation of MIMO radar systems may be achieved, e.g., in the automotive domain.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

While the present invention has been described above by reference to various embodiments, it may be understood that many changes and modifications may be made to the described embodiments. It is therefore intended that the foregoing description be regarded as illustrative rather than limiting, and that it be understood that all equivalents and/or combinations of embodiments are intended to be included in this description.

The invention claimed is:

1. A method for computer-implemented simulation of radar raw data generated for a synthetic MIMO radar system comprising a transmitter array of several transmitters for transmitting radar signals and a receiver array of several receivers for receiving radar echoes of the radar signals, wherein for a single preset transmit-ting position within the transmitter array and a single preset receiving position within the receiver array the method is performed for a transmission event of at least one transmitter of the transmitting array, the method comprising:
   performing ray tracing of a radar signal sent from the preset transmitting position and received at the preset receiving position based on a 3D model of a virtual area adjacent to the synthetic MIMO radar system, the 3D model describing one or more objects in the virtual area and their interaction properties with the radar signal, where the ray tracing determines propagations of a plurality of rays within the radar signal from the preset transmitting position to the preset receiving position, the propagation of each ray of the plurality of rays describing ray poses along a ray path from the preset transmitting position to the preset receiving position and comprising a path length of the ray path, the ray poses and the path length dependent on a first angle and a second angle describing the direction of a respective ray of the plurality of rays at the preset transmitting position;
   determining for each ray of the plurality of rays, first order derivatives, the first order derivatives comprising a first derivative that is a derivative of the ray poses with respect to the first angle, a second derivative that is a derivative of the ray poses with respect to the second angle, a third derivative that is a derivative of the path length with respect to the first angle and a fourth derivative that is a derivative of the path length with respect to the second angle;
   determining for each ray of the plurality of rays, propagations of a plurality of modified rays based on a linear approximation using the first order derivatives and a deviation of the first and second angles of the modified rays from each ray of the plurality of rays, each modified ray belonging to a different pair of a transmitter of the transmitter array and a receiver of the receiver array, where the propagation of a respective modified ray describes ray poses along the ray path from the transmitter to the receiver of the pair to which the respective modified ray belongs and comprises the path length of the ray path from the transmitter to the receiver;
   for each modified ray, determining a radar echo of the respective modified ray arriving at the receiver of the pair to which the respective modified ray belongs based on the 3D model and based on the path length of the respective modified ray;
   for each receiver of the receiver array, combining an amplitude and a phase of all radar echoes of modified rays arriving at the respective receiver resulting in the radar raw data.

2. The method according to claim 1, wherein the propagation of each ray of the plurality of rays further comprises a Doppler velocity that is a sum of the relative velocities of all objects passed by a respective ray of the plurality or rays along the ray path, the relative velocities being the velocities of the passed objects relative to the synthetic MIMO radar system in a direction parallel to the respective ray of the plurality of rays and dependent on the first angle and a second angle, wherein determining the first order derivatives further comprises determining a fifth derivative and a sixth derivative, wherein the fifth derivative is a first-order derivative of a Doppler velocity with respect to the first angle and the sixth derivative is a first-order derivative of the Doppler velocity with respect to the second angle, and wherein determining propagations of the plurality of modified rays further comprises determining the Doppler velocities of the modified rays is based on a linear approximation using the fifth and sixth derivatives and the deviation of the first and second angles of the modified rays from each ray of the plurality of rays.

3. The method of claim 1, wherein the preset transmitting position is such that all transmitters of the transmitter array have substantially the same distance to the preset transmitting position and/or the preset receiving position is such that all receivers of the receiver array have substantially the same distance to the pre-set receiving position.

4. The method of claim 1, wherein all transmitters of the transmitter array are arranged in a flat plane, the preset transmit-ting position located in the flat plane, and/or all receivers of the receiver array are arranged in a flat plane, the preset receiving position located in the flat plane.

5. The method of claim 1, wherein the transmitting array comprises at least three transmitters and the receiving array comprises at least three receivers.

6. The method of claim 1, wherein the synthetic MIMO radar system is a radar system installed in a motor vehicle and the virtual area refers to a traffic situation in a neighborhood of the motor vehicle.

7. An apparatus for computer-implemented simulation of radar raw data generated for a synthetic MIMO radar system comprising a transmitter array of several transmitters for transmitting radar signals and a receiver array of several receivers for receiving radar echoes of the radar signals, wherein for a single preset transmit-ting position within the transmitter array and a single preset receiving position within the receiver array, wherein the apparatus is configured to perform the following steps for a transmission event of at least one transmitter of the transmitting array:
   performing ray tracing of a radar signal sent from the preset transmitting position and received at the preset receiving position based on a 3D model of a virtual area adjacent to the synthetic MIMO radar system, the 3D model describing one or more objects in the virtual area and their interaction properties with the radar signal, where the ray tracing determines propagations of a plurality of rays within the radar signal from the preset transmitting position to the preset receiving position, the propagation of each ray of the plurality of rays describing ray poses along a ray path from the preset transmitting position to the preset receiving position and comprising a path length of the ray path, the ray poses and the path length dependent on a first angle and a second angle describing the direction of a respective ray of the plurality of rays at the preset transmitting position;

determining for each ray of the plurality of rays, first order derivatives, the first order derivatives comprising a first derivative that is a derivative of the ray poses with respect to the first angle, a second derivative that is a derivative of the ray poses with respect to the second angle, a third derivative that is a derivative of the path length with respect to the first angle and a fourth derivative that is a derivative of the path length with respect to the second angle;

determining for each ray of the plurality of rays, propagations of a plurality of modified rays based on a linear approximation using the first order derivatives and a deviation of the first and second angles of the modified rays from each ray of the plurality of rays, each modified ray belonging to a different pair of a transmitter of the transmitter array and a receiver of the receiver array, where the propagation of a respective modified ray describes ray poses along the ray path from the transmitter to the receiver of the pair to which the respective modified ray belongs and comprises the path length of the ray path from the transmitter to the receiver;

for each modified ray, determining a radar echo of the respective modified ray arriving at the receiver of the pair to which the respective modified ray belongs based on the 3D model and based on the path length of the respective modified ray;

for each receiver of the receiver array, combining an amplitude and a phase of all radar echoes of modified rays arriving at the respective receiver resulting in the radar raw data.

8. The apparatus of claim 7 wherein the propagation of each ray of the plurality of rays further comprises a Doppler velocity that is a sum of the relative velocities of all objects passed by a respective ray of the plurality or rays along the ray path, the relative velocities being the velocities of the passed objects relative to the synthetic MIMO radar system in a direction parallel to the respective ray of the plurality of rays and dependent on the first angle and a second angle, wherein determining the first order derivatives further comprises determining a fifth derivative and a sixth derivative, wherein the fifth derivative is a first-order derivative of a Doppler velocity with respect to the first angle and the sixth derivative is a first-order derivative of the Doppler velocity with respect to the second angle, and wherein determining propagations of the plurality of modified rays further comprises determining the Doppler velocities of the modified rays is based on a linear approximation using the fifth and sixth derivatives and the deviation of the first and second angles of the modified rays from each ray of the plurality of rays.

9. The apparatus of claim 7, wherein the preset transmitting position is such that all transmitters of the transmitter array have substantially the same distance to the preset transmitting position and/or the preset receiving position is such that all receivers of the receiver array have substantially the same distance to the pre-set receiving position.

10. The apparatus of claim 7, wherein all transmitters of the transmitter array are arranged in a flat plane, the preset transmit-ting position located in the flat plane, and/or all receivers of the receiver array are arranged in a flat plane, the preset receiving position located in the flat plane.

11. The apparatus of claim 7, wherein the transmitting array comprises at least three transmitters and the receiving array comprises at least three receivers.

12. The apparatus of claim 7, wherein the synthetic MIMO radar system is a radar system installed in a motor vehicle and the virtual area refers to a traffic situation in a neighborhood of the motor vehicle.

* * * * *